(12) United States Patent
El-Kadri et al.

(10) Patent No.: US 8,457,603 B2
(45) Date of Patent: Jun. 4, 2013

(54) SYSTEM AND METHOD FOR SELF-SERVE PROVISIONING OF SERVICES ON A MOBILE COMMUNICATION DEVICE

(75) Inventors: Baraa El-Kadri, Milton (CA); Levente Janosi, Dundas (CA); Axel Ferrazzini, Dundas (CA); Gaëlle Martin-Cocher, Toronto (CA)

(73) Assignee: Research in Motion Limited, Waterloo, Ontario (CA)

( * ) Notice: Subject to any disclaimer, the term of this patent is extended or adjusted under 35 U.S.C. 154(b) by 557 days.

(21) Appl. No.: 12/475,278

(22) Filed: May 29, 2009

(65) Prior Publication Data

US 2010/0190475 A1 Jul. 29, 2010

Related U.S. Application Data

(60) Provisional application No. 61/146,965, filed on Jan. 23, 2009.

(51) Int. Cl.
*H04M 3/42* (2006.01)

(52) U.S. Cl.
USPC .......................... 455/414.1; 455/418; 455/419

(58) Field of Classification Search
USPC ....................... 455/414.1, 418, 419
See application file for complete search history.

(56) References Cited

U.S. PATENT DOCUMENTS

| | | | | |
|---|---|---|---|---|
| 7,761,081 | B2* | 7/2010 | Shamanna | 455/405 |
| 7,817,988 | B2* | 10/2010 | Kruis et al. | 455/414.1 |
| 2002/0196919 | A1 | 12/2002 | Ruckart et al. | |
| 2004/0242209 | A1* | 12/2004 | Kruis et al. | 455/414.1 |
| 2005/0105467 | A1 | 5/2005 | True et al. | |
| 2005/0131837 | A1* | 6/2005 | Sanctis et al. | 705/64 |
| 2006/0223576 | A1* | 10/2006 | Macaluso | 455/552.1 |
| 2009/0082004 | A1* | 3/2009 | Duggal et al. | 455/419 |
| 2009/0170538 | A1* | 7/2009 | Shrivathsan et al. | 455/466 |

FOREIGN PATENT DOCUMENTS

EP 0999690 A 5/2000

* cited by examiner

*Primary Examiner* — Lester Kincaid
*Assistant Examiner* — Steven Kelley
(74) *Attorney, Agent, or Firm* — Perry + Currier

(57) ABSTRACT

There is disclosed a system and method for provisioning a mobile communication device on a network. In an embodiment, the method comprises: identifying one or more devices on the network to which a notification of an offer of service should be sent; pushing the notification of an offer of service to the identified devices over the network; if the offer of service is accepted at the device, then initiating a provisioning request from the device to one or more of a carrier, service provider or management authority; and upon authorization of the provisioning request by the management authority, provisioning the service from the service provider.

20 Claims, 5 Drawing Sheets

SYSTEM AND METHOD FOR SELF-SERVE PROVISIONING OF SERVICES ON A MOBILE COMMUNICATION DEVICE

RELATED APPLICATION INFORMATION

This application claims the benefit of U.S. Provisional Patent Application No. 61/146,965 filed Jan. 23, 2009, the disclosure of which is incorporated herein by reference in its entirety.

FIELD OF THE INVENTION

The present invention relates generally to a system and method for self-serve provisioning of services on a mobile communication device.

BACKGROUND

From time-to-time, suppliers of communication services may introduce or promote new or existing services that may be offered to subscribers of various carriers. Such services may include, for example, electronic mail (email), voice communications, instant text messaging, Internet browsing, multimedia downloading, accessing applets or games, and various other services that may become available with the introduction of a new communication device. Similarly, carriers may want to promote, over time, various other services (e.g. enhance voice plan, new data plan) to their subscribers. Today, if a user wants to change her mobile device's plan and/or subscribe to additional services, she has to contact her carrier's customer care representative, and potentially have to go through multiple stopping points. Then, once validated by a customer care representative, the provisioning of the selected service(s) may be effected.

DETAILED DESCRIPTION

As noted above, the present invention relates to a system and method for self-serve provisioning of services on a mobile communication device. As noted above, today, if a user wants to change her mobile device's plan and/or subscribe to additional services, she has to contact her customer care representative and go through multiple potential stopping points. Then, once validated by the customer care representative, the provisioning of the service(s) chosen may be effected by the customer care representative or intermediary into a provisioning system that may trigger potential modifications within the network infrastructure and within the mobile device. This process may be cumbersome or inconvenient for the user or customer care representative. As will be described below, a self-serve provisioning system and method is described which would potentially reduce this hurdle chain of actions, promote revenue growth for carriers and service providers, and improve the user experience for users of wireless mobile communication devices.

Figure 1:
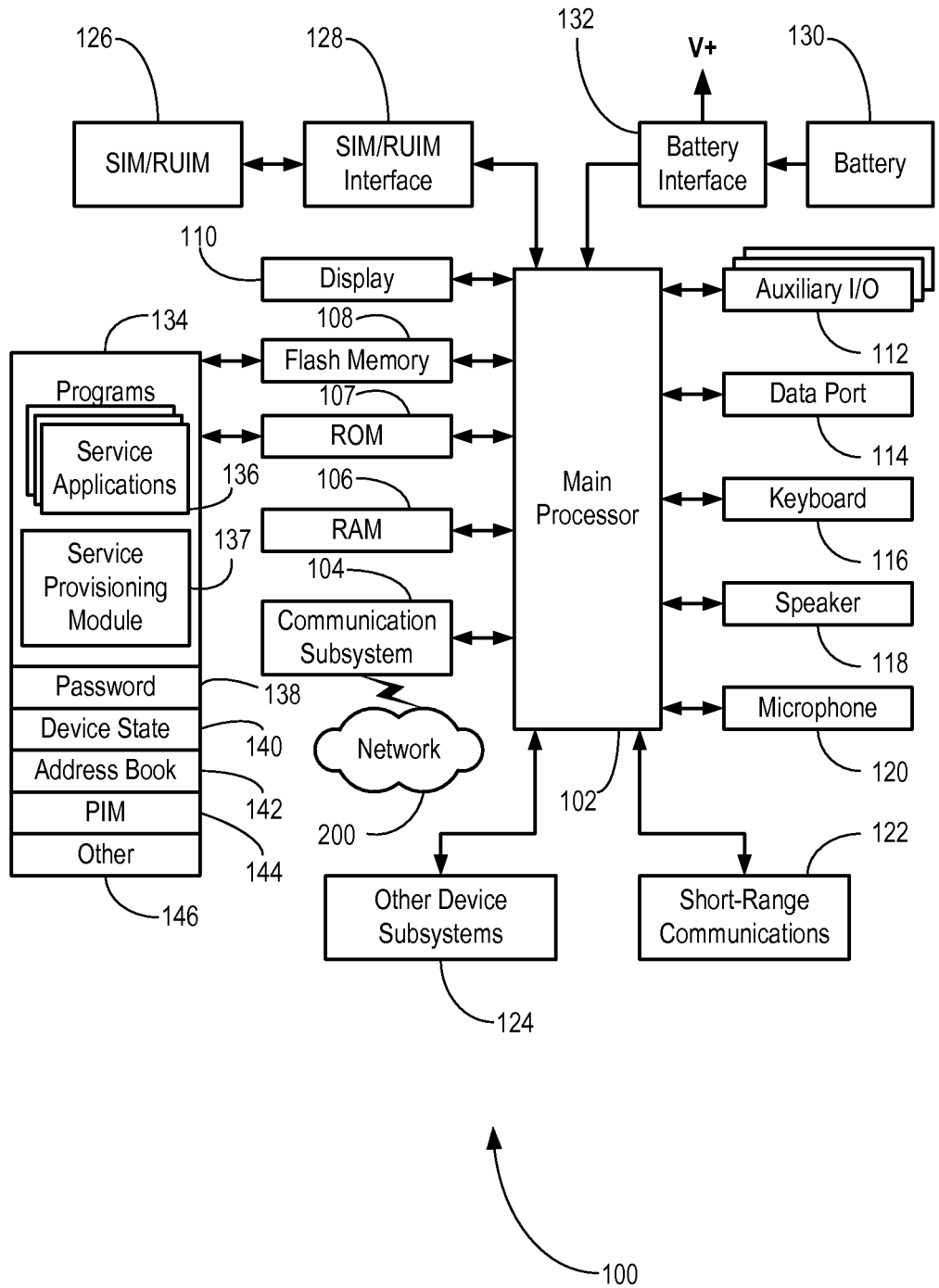
FIG. 1 is an illustration of a mobile communication device in accordance with an embodiment.

Shown in FIG. 1 is a schematic block diagram of an illustrative mobile handheld device 100. The handheld device 100 may comprise a number of components, including a main processor 102 which controls the overall operation of device 100. Various communication functions, including data and voice communications, Internet browsing, instant text messaging, etc. may be performed through a communication subsystem 104 via wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The device 100 may be a battery-powered device and may include a battery interface 132 for receiving one or more rechargeable batteries 130 and for powering the various subsystems described above.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

Handheld device 100 may also include a read-only memory (ROM) 107 that may store a non-alterable electronic serial number or ESN which may be burned into ROM 107 at the time of manufacture of device 100. In addition, handheld device 100 may have a unique product identification number (PIN) stored in the ROM 107, or in another memory store in device 100.

The main processor 102, in addition to its operating system functions, enables execution of software applications 134 on the device 100. The software applications 134 may control various device features and services, and may be installed on the device 100 during its manufacture, or may be subsequently loaded onto the device 100 as a software update through one of the wireless network 200, the auxiliary I/O subsystem 112, the data port 114, the short-range communications subsystem 122, or another subsystem 124.

The software applications 134 may include, for example, various communication service modules 136 (e.g. email, instant text messaging, Internet browsing, music downloading, etc.), and a password approval module 138. The software applications 134 may also include a device service provisioning module 137 for managing the service applications provisioned for device 100 on a carrier network.

The handheld device 100 may further include a device state module 140, an address book 142, a personal information manager (PIM) 144, and various other modules 146.

To identify a user, the communications device 100 may use a SIM/RUIM/USIM card 126 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 126 is one type of a conventional "smart card" that can be used to identify a user of the communications device 100 and to personalize the communications device 100, among other things. By inserting the SIM/RUIM/USIM card 126 into the SIM/RUIM/USIM interface 128, a user can access subscribed services. Such subscribed services may include, for example, web browsing and messaging such as email, voice mail, SMS, and Multimedia Messaging Services (MMS).

Figure 2:
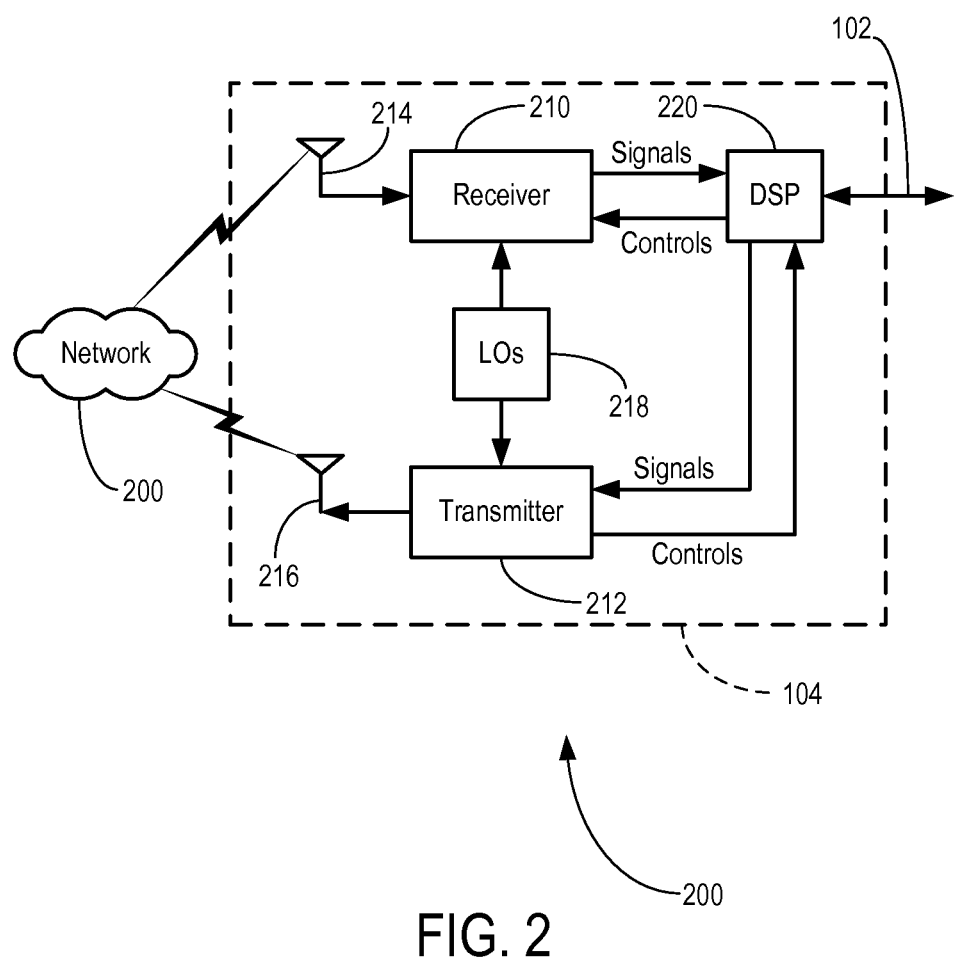
FIG. 2 is a schematic block diagram of a communication subsystem component in the device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216.

Figure 3:
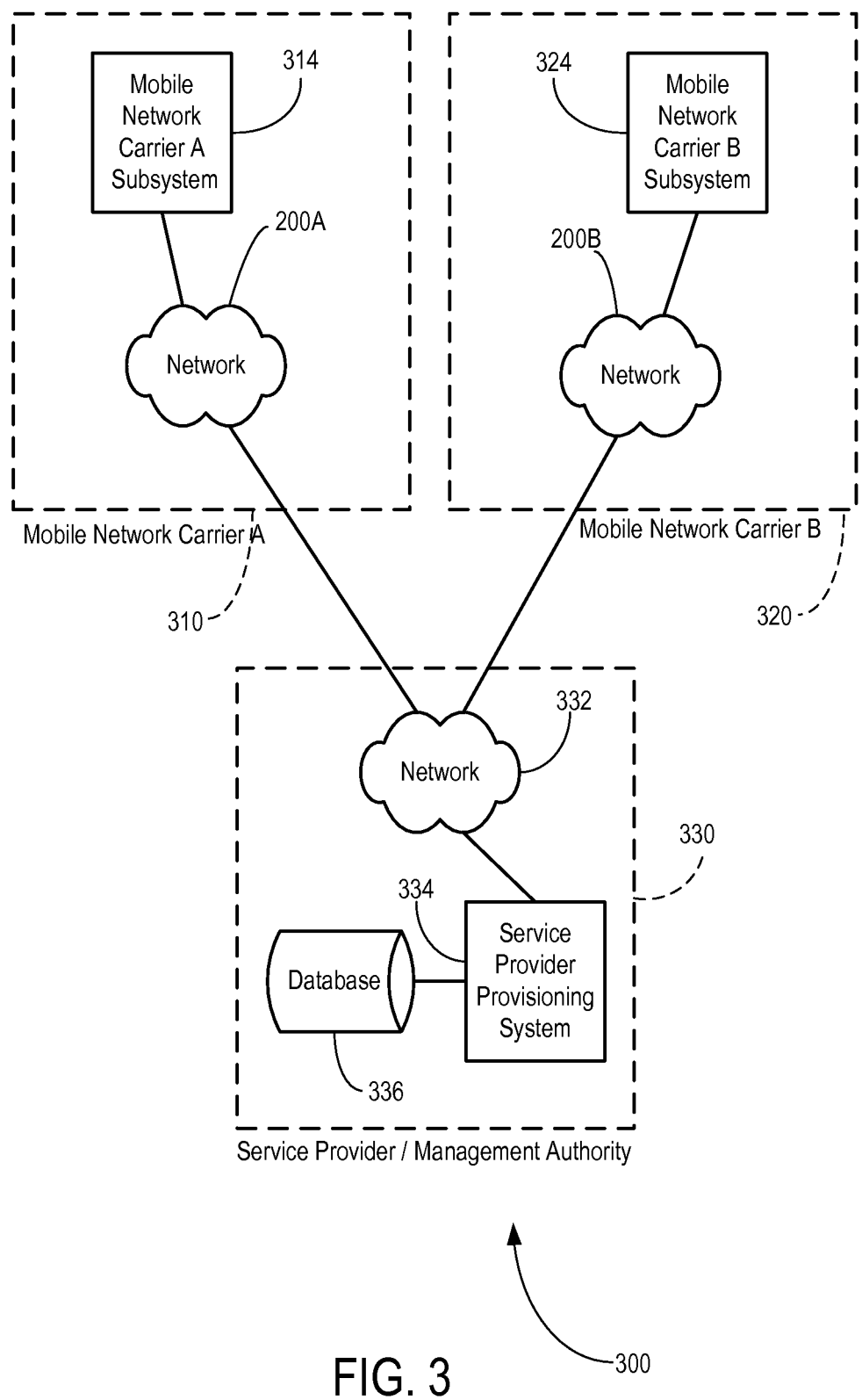
FIG. 3 is a schematic block diagram of a system in accordance with an embodiment.

Now referring to FIG. 3, shown is an illustrative schematic block diagram 300 with including a mobile network carrier A 310, mobile network carrier B 320, and a service provider 330. With the various components and subsystems described above, device 100 may be configured to access various services available through wireless carrier networks 200A and 200B of mobile network carrier A 310 and mobile network carrier B 320, respectively. As shown, each of the wireless carrier networks 200A, 200B may have subsystems 314, 324 for provisioning various wireless services for devices 100 on their respective wireless carrier networks. A service provider 330 may also offer various external communication services via network connections to the service provider 330's own network infrastructure 332. The external communication services offered by the service provider may include, for example, wireless email, instant text messaging, downloading of multimedia content, and various other services made available to subscribers on wireless carrier networks 200A, 200B.

The service provider 330's network infrastructure 332 may connect to a provisioning system 334 maintained by the service provider 330 and which may be appropriately configured to interact with subsystems 314, 324 provided on each of the wireless carrier networks 200A, 200B. In an embodiment, via provisioning system 334, service provider 330 may maintain a database 336 of services that have been provisioned for each of the mobile communication devices 100 on the wireless carrier networks 200A, 200B of mobile network carrier A 310, and mobile network carrier B 320. In the database 336 of provisioning system 334, each of the devices 100 may be uniquely identified, for example, by the unique ESN burned into the ROM 107 of each device 100. Alternatively, each device 100 may be uniquely identified by the unique PIN identifier stored in ROM 107, or in another memory store in device 100. Records in database 336 may contain the unique ESN or PIN retrieved from ROM 107 or another memory store on each device 100. Each device 100 may thus be uniquely recognized by the supplier's provisioning system 334. Records in database 336 may also store information for the owning mobile carrier (e.g. mobile network carrier A 310, or mobile network carrier B 320), and this information may be linked to the unique ESN or PIN of device 100.

In an embodiment, each of the mobile communication devices 100 may be associated with a unique billing identification (BID) based on the ESN, PIN, a phone number, or SIM card. This information may be stored for example in the subsystems 314, 324 of mobile network carrier A 310, or mobile network carrier B 320, and in the database 336 of provisioning system 334 as may be appropriate. The subsystems 314, 324 and database 336 of provisioning system 334 may also store for each device 100 information on various services that have been provisioned for that device (e.g. email, voice, Internet access, music downloading, etc.). Use of the various services which are subscribed to may be monitored by a subscriber's unique BID, and billed directly or indirectly to the subscriber by one of the carriers 310, 320 or the service provider 330.

Figure 4:
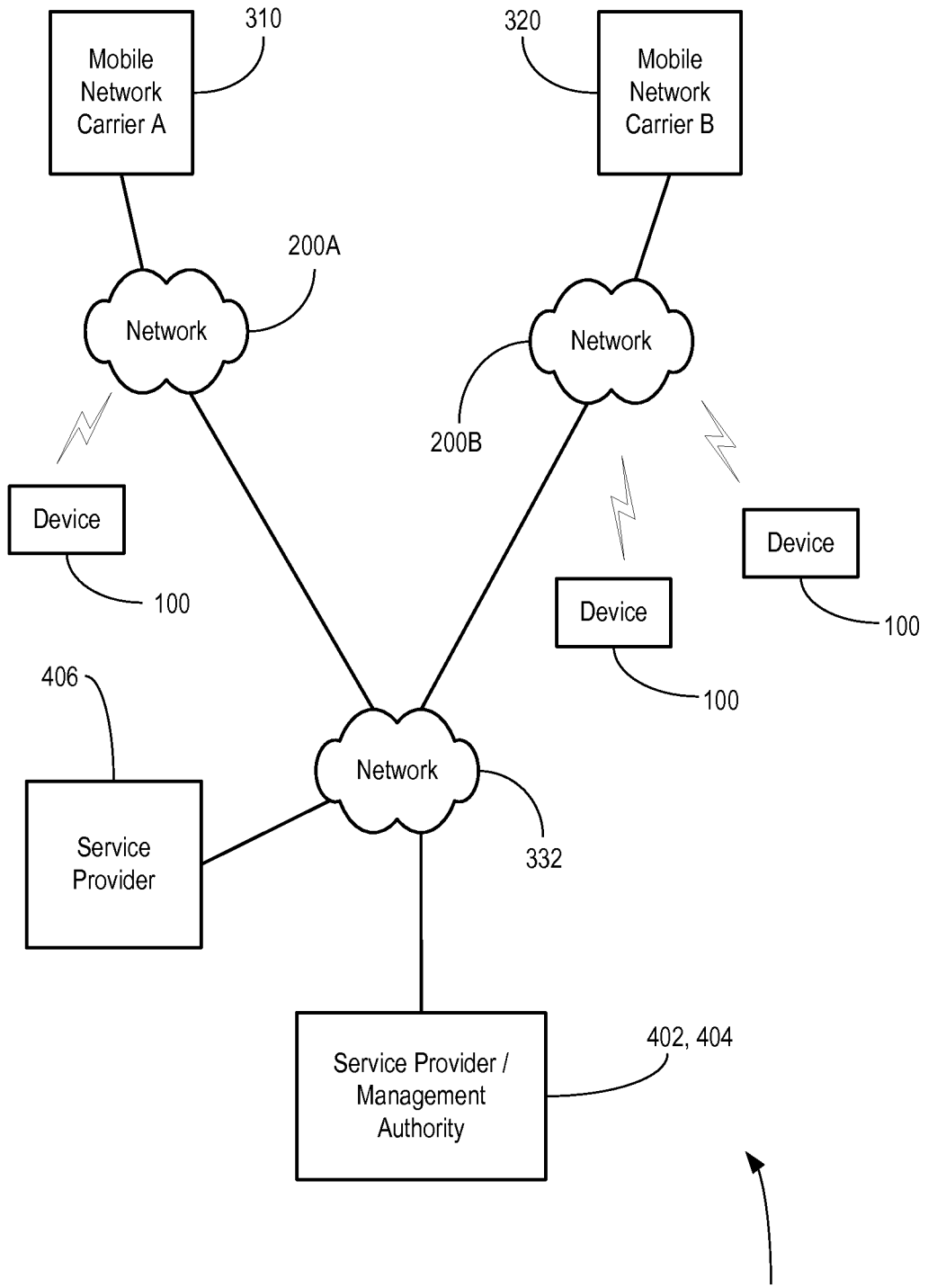
FIG. 4 is schematic block diagrams of a provisioning management system in accordance with an embodiment.

Now referring to FIG. 4, shown in a schematic block diagram of various roles that may be played within an illustrative provisioning management system 400 in accordance with an embodiment. As shown, the various roles played may include a management authority 402, and one or more external service providers 404, 406. The provisioning management system may include one or more mobile network carriers 310, 320 providing mobile network communication services to various devices 100. As shown, devices 100 may be connected to one or the other mobile network carrier 310 or 320, which may in turn be connected to one or more external service providers 404, 406, and one or more management authorities 402. In an embodiment, the service provider and management authority 404, 402 may be one and the same, and may be the service provider 330 from FIG. 3 for example. It is also possible that the external service provider 406 may be a third party service provider that must look to another entity as the management authority 402. It is also possible that the mobile network carriers 310, 312 themselves are service providers, management authorities, or both. Thus, it will be appreciated that the roles of service providers, and management authorities, may be potentially played by any of the entities within the provisioning management system 400 linking all of these entities.

In an embodiment, new services available from service providers 404, 406 may be offered and promoted by using a notification mechanism on the devices 100. Notifications required by the service providers 404, 406, are pushed either directly to the device 100 or using an intermediary. The notification mechanism may be, for example, an e-mail module, text messaging module, or a dedicated module for notification of available services, such as device service provisioning module 137 mentioned earlier.

In an embodiment, notification of the new service may be pushed by service providers 404, 406, or by the carriers 310, 320 as a promotional push to their end users on devices 100. The service providers 404, 406 or carriers 310, 320 may be provided by the provisioning management system 400 with a set of filters and search criteria to obtain a specific target audience who may welcome receiving the notification/promotional offer. For example, the set of filters or search criteria could include a check of whether or not the user already subscribes to a mobile device plan including the feature, and also checking whether a particular device 100 is configured to support the feature with its firmware and hardware capabilities. This may be done by searching one of the provisioning databases, for example. The set of filters and search criteria may also check other user information, if available, such that the particular feature or service may be pushed to a specific target marketing group. As will be appreciated, for any given service, the provisioning management system 400 will be under the corresponding management authority control.

Alternatively, for those users who would prefer not to receive unsolicited advertising or promotion or new services, device service provisioning module 137 may be configured to periodically check for any new features that may be available for the device 100 by activating a polling feature in the device service provisioning module 137. Again, the same filters could be used to selectively allow offers or promotions to be pulled by device service provisioning module 137. In this case, rather than receiving unsolicited offers and promotions pushed to the device, the end user may be given the option of checking for availability. In either case, if a user accepts an offer, modifications may be applied to the various applications and services that are impacted by the user choice.

In an embodiment, in order to avoid the need for complex provisioning policies and carrier staff training, devices 100 may be provisioned by the user upon initial device setup when they first try to access the network of a mobile network carrier. Suppose that a mobile communication device 100 is turned on for the first time with a new SIM card, or a new SIM card is inserted. Based on the SIM card, the device 100 tries to access mobile network carrier A 310, and mobile network carrier A 310 determines that no data plan is set up. In an embodiment, the device service provisioning module 137 may provide an initial device setup icon which the end user can select from a display on device 100, and be presented with a list of available data plans and associated services available on mobile network carrier A 310. The user may select one data plan that will trigger the provisioning of the corresponding service(s) on the device 100, and modify the necessary infrastructure and IT system settings to allow the user to enjoy her new service (s).

For example, the first infrastructure service that may be set up in this manner is a billing service, which may set up a unique billing identification (BID) based on an inserted SIM, ESN or PIN of the device 100, or some other unique identification information provided by the user (e.g. valid credit card on file used to purchase the device 100).

With the self-serve provisioning and set up of billing identification for the device 100, the user may select from one of a number of available services. For example, the user may select a basic service to perform basic functions on the mobile communication device, such as enabling telephony functions and basic email only. Alternatively, the end user may select an upgrade of his existing data plan to also perform text messaging, or select another level to also access Internet browsing.

In an embodiment, in response to an offer or promotion notification, the end user may launch an application on her device 100 (e.g. browser) to access a service she is not currently subscribed to (e.g. web-browsing). Upon access, the device 100 may display a message inviting her to trial and/or to subscribe to the service or to another action (cancel for instance). Alternatively, when the user clicks on the offer or promotion notification, the service provider is notified of the action, and in response the end user will receive a message explaining how she can enjoy the service (legal explanation, pricing, etc.).

If the user accepts, the device 100 will request the provisioning of the service to the service provider 404, 406, its intermediary or the management authority 402. The device 100 will be provisioned, the infrastructure and IT system updated accordingly. Alternatively, the end user will select an upgrade of his existing application (Voice over Internet Protocol functions of an Instant Messaging (IM) service), or new services running from the same application (other IM services from the same service provider).

In another embodiment, if the service provider wants to promote a new service, the service provider may push (to selected devices with or without using an intermediary) a notification (new icon, blinking existing icon and/or message for instance), and the service parameters/settings/necessary components may be provisioned and the IT system and infrastructure updated accordingly. Then when the user accepts the promotion, the device 100 is already set and ready to provide the service.

In an embodiment, the system may be structured differently depending on the roles that the service provider or carrier may play. For example, if the service provider/management authority and the mobile network carrier are different, the service may be provisioned separately by the service provider. In this case, the service provider may notify the mobile network carrier, and the mobile network carrier may make the necessary network, infrastructure, and billing modification. An appropriate billing system may be set up to suitably reward both the mobile network carrier and the service provider, based for example on a license fee sharing arrangement or provisioning service fee arrangement.

In another embodiment, if the management authority and the service provider are different, before any action taken, the service provider must notify the management authority, as the management authority is in charge of the IT policy management, and may or may not modify it to authorize the service provider to provision the device.

In another embodiment, the service provider may be allowed to access criteria and rules to select the appropriate target audience for a service. For example, the management authority may apply different rules according to various criteria to provision devices.

In another embodiment, the provisioning management system may provide to a service provider means (i.e. search capabilities) to select the targeted audience based on the management rules and criteria (e.g.: user having data plan A, device type B, having accepted trial X etc.). The provisioning management system may also provide means to select the type of notification (e.g.: new message, new icon, visual indication on existing icon, advertisement of the offer on the ribbon or task bar, etc.), and means to define when the notification is to be delivered. The provisioning management system may also provide means to provide the notification package to the user for review and acceptance or refusal.

Figure 5:
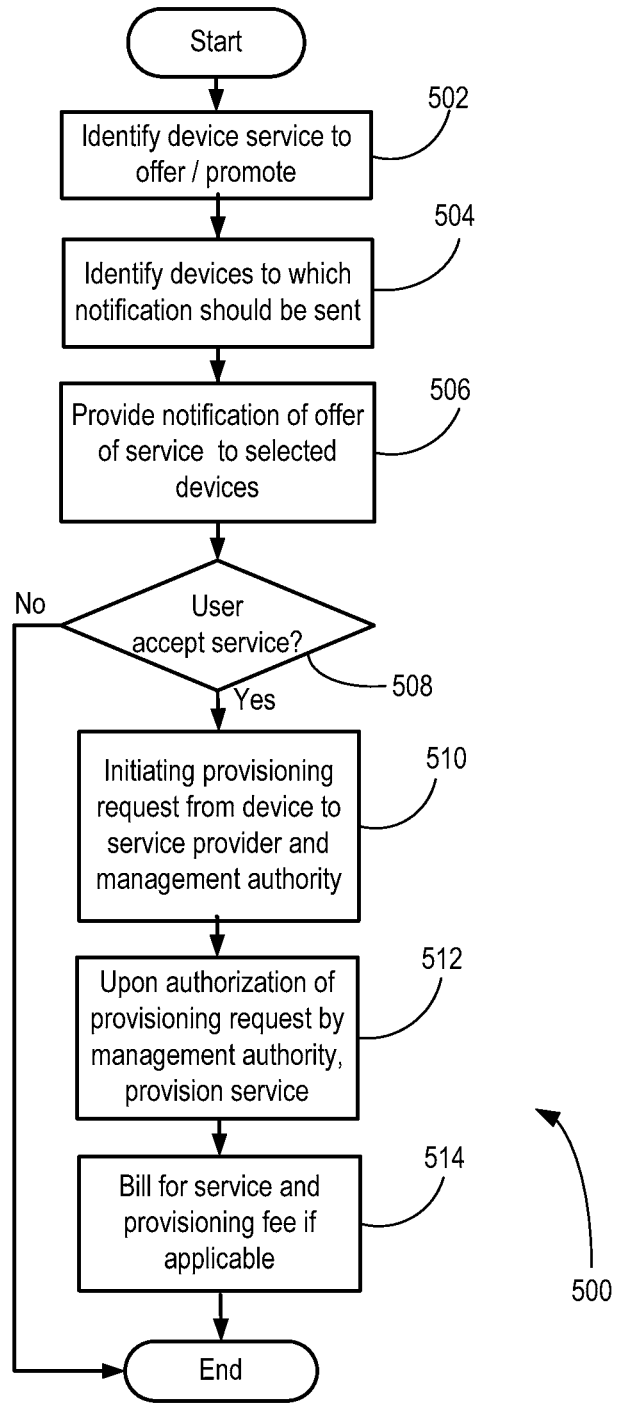
FIG. 5 is an illustrative flowchart of a method in accordance with an embodiment.

Now referring to FIG. 5, shown is an illustrative method for managing services for carrier subscribers in accordance with an embodiment. As shown, method 500 begins at block 502, where method 500 identifies a device service to offer and promote.

Method 500 then proceeds to block 504, where method 500 identifies which devices the notification of offer of service/promotion should be sent to. As described earlier, this may be done by using selective filters or search criteria to identify a target market for the offer/promotion.

Method 500 then proceeds to block 506, where method 500 pushes the notification of an offer of service/promotion to selected devices. At decision block 508, method 500 waits to receive user acceptance of the service offer/promotion. This may be an acceptance to start normal service with a fee, or it may be a trial offer for the user to try the service for a limited time. If the user does not accept the service, method 500 simply ends. However, if the user accepts the service, whether normal service or a trial service, method 500 proceeds to block 510.

At block 510, method 500 initiates a provisioning request from the device to provision the accepted service by notifying a service provider and management authority of the user acceptance and provisioning request. As described above, if the service provider and management authority are different entities, the service provider will require authorization from the management authority before provisioning can proceed.

Method 500 then proceeds to block 512, where method 500 can then bill appropriately for services and for a provisioning fee if applicable.

Thus, in accordance with an aspect, there is provided a method of provisioning a mobile communication device on a network, comprising: identifying one or more devices on the network to which a notification of an offer of service should be sent; pushing the notification of an offer of service to the identified devices over the network; if the offer of service is accepted at the device, then initiating a provisioning request from the device to one or more of a carrier, service provider or management authority; and upon authorization of the provisioning request by the management authority, provisioning the service from the service provider.

In an embodiment, the method further comprises providing as a notification mechanism an indication or message to one or more of an e-mail module, text messaging module, or a dedicated device service provisioning module for pushing the notification of an offer of service to the identified devices over the network.

In another embodiment, the method further comprises allowing a service provider to access criteria and rules for selecting identified devices corresponding to a target audience for a service.

In another embodiment, the method further comprises displaying on the device the notification of an offer of service as one or more of a new message, a new icon, a visual indication on an existing icon, or an advertisement on a ribbon or task bar.

In another embodiment, the method further comprises: preparing one or more of service parameters, settings or necessary components for provisioning the offer of service; and upon acceptance of the offer of service at the device, executing the one or more of service parameters, settings or necessary components and provisioning the network infrastructure and device to provide the service.

In another embodiment, the carrier, service provider and management authority comprise one or more entities, and the method further comprises: notifying the management authority of the provisioning request; and awaiting authorization of the provisioning request by the management authority.

In another embodiment, the method further comprises rewarding via a billing system one or more of the carrier, service provider or management authority.

In another aspect, there is provided a provisioning management system for provisioning a mobile communication device on a network, the provisioning management system being adapted to: identify one or more devices on the network to which a notification of an offer of service should be sent; push the notification of an offer of service to the identified devices over the network; if the offer of service is accepted at the device, then initiate a provisioning request from the device to one or more of a carrier, service provider or management authority; and upon authorization of the provisioning request by the management authority, provision the service from the service provider.

In an embodiment, the system is further adapted to provide as a notification mechanism an indication or message to one or more of an e-mail module, text messaging module, or a dedicated device service provisioning module for pushing the notification of an offer of service to the identified devices over the network.

In another embodiment, the system is further adapted to allow a service provider to access criteria and rules for selecting identified devices corresponding to a target audience for a service.

In another embodiment, the system is further adapted to display on the device the notification of an offer of service as one or more of a new message, a new icon, a visual indication on an existing icon, or an advertisement on a ribbon or task bar.

In another embodiment, the system is further adapted to: prepare one or more of service parameters, settings or necessary components for provisioning the offer of service; and upon acceptance of the offer of service at the device, execute the one or more of service parameters, settings or necessary components and provisioning the network infrastructure and device to provide the service.

In another embodiment, the carrier, service provider and management authority comprise one or more entities, and the system is further adapted to: notify the management authority of the provisioning request; and await authorization of the provisioning request by the management authority.

In another embodiment, the system is further comprises a billing system to reward one or more of the carrier, service provider or management authority.

In another aspect, there is provided a data processor readable medium storing data processor code that when loaded into one or more components of a system adapts the system to provision a mobile communication device on a network, the data processor medium comprising: code for identifying one or more devices on the network to which a notification of an offer of service should be sent; code for pushing the notification of an offer of service to the identified devices over the network; code for initiating, if the offer of service is accepted at the device, a provisioning request from the device to one or more of a carrier, service provider or management authority; and code for provisioning the service from the service provider upon authorization of the provisioning request by the management authority.

In an embodiment, the data processor readable medium further comprises code for providing as a notification mechanism an indication or message to one or more of an e-mail module, text messaging module, or a dedicated device service provisioning module for pushing the notification of an offer of service to the identified devices over the network.

In another embodiment, the data processor readable medium further comprises code for allowing a service provider to access criteria and rules for selecting identified devices corresponding to a target audience for a service.

In another embodiment, the data processor readable medium further comprises code for displaying on the device the notification of an offer of service as one or more of a new message, a new icon, a visual indication on an existing icon, or an advertisement on a ribbon or task bar.

In another embodiment, the data processor readable medium further comprises: code for preparing one or more of service parameters, settings or necessary components for provisioning the offer of service; and code for executing, upon acceptance of the offer of service at the device, the one or more of service parameters, settings or necessary components and provisioning the network infrastructure and device to provide the service.

In another embodiment, the carrier, service provider and management authority comprise one or more entities, and the data processor readable medium further comprises: code for notifying the management authority of the provisioning request; and code for awaiting authorization of the provisioning request by the management authority.

While illustrative embodiments have been described above, it will be appreciated that various changes and modifications may be made. More generally, the scope of the invention is defined by the following claims.

What is claimed is:

1. A method of provisioning a mobile communication device on a network, comprising:

identifying one or more devices on the network to which a notification of an offer of service should be sent, the identifying comprising:

providing search capabilities to access criteria and rules for selecting devices corresponding to a target audience for a service, and checking whether the devices are configured to support the service with its firmware and hardware capabilities;

pushing the notification of an offer of service to identified devices over the network;

when the offer of service is accepted at a given identified device, then initiating a provisioning request from the given identified device to one or more of a carrier, service provider or management authority; and upon authorization of the provisioning request by the management authority, provisioning the service from the service provider.

2. The method of claim 1, further comprising providing as a notification mechanism an indication or message to one or more of an e-mail module, a text messaging module, or a dedicated device service provisioning module for pushing the notification of an offer of service to the identified devices over the network.

3. The method of claim 1, further comprising allowing a service provider to access criteria and rules for selecting the identified devices corresponding to a target audience for a service.

4. The method of claim 1, further comprising displaying on the identified devices the notification of an offer of service as one or more of a new message, a new icon, a visual indication on an existing icon, or an advertisement on a ribbon or task bar.

5. The method of claim 1, further comprising: preparing one or more of service parameters, settings or necessary components for provisioning the offer of service; and upon acceptance of the offer of service at the given identified device, executing the one or more of service parameters, settings or necessary components and provisioning the network infrastructure and the given identified device to provide the service.

6. The method of claim 1, wherein the carrier, service provider and management authority comprise one or more entities, and the method further comprises: notifying the management authority of the provisioning request; and awaiting authorization of the provisioning request by the management authority.

7. The method of claim 6, further comprising rewarding via a billing system one or more of the carrier, service provider or management authority.

8. A service provider network infrastructure comprising:

a database storing records of services provisioned for each of one or more mobile communications devices on a network; and a provisioning system enabled to:

identify one or more mobile communications devices on the network to which a notification of an offer of service should be sent, using the database, wherein to identify the one or more mobile communications devices, the system is enabled to:

provide search capabilities to access criteria and rules for selecting the mobile communication devices corresponding to a target audience for a service, and checking whether the mobile communication devices are configured to support the service with its firmware and hardware capabilities;

push the notification of an offer of service to identified mobile communications devices over the network;

when the offer of service is accepted at a given identified mobile communications device, then initiate a provisioning request from the given identified mobile communications device to one or more of a carrier, service provider or management authority; and upon authorization of the provisioning request by the management authority, provision the service from the service provider.

9. The service provider network infrastructure of claim 8, wherein the system is further enabled to provide as a notification mechanism an indication or message to one or more of an e-mail module, a text messaging module, or a dedicated device service provisioning module for pushing the notification of an offer of service to the identified devices over the network.

10. The service provider network infrastructure of claim 8, wherein the system is further enabled to allow a service provider to access criteria and rules for selecting identified devices corresponding to a target audience for a service.

11. The service provider network infrastructure of claim 8, wherein the system is further enabled to display on the given identified mobile communications device the notification of an offer of service as one or more of a new message, a new icon, a visual indication on an existing icon, or an advertisement on a ribbon or task bar.

12. The service provider network infrastructure of claim 8, wherein the system is further enabled to: prepare one or more of service parameters, settings or necessary components for provisioning the offer of service; and upon acceptance of the offer of service at the given identified mobile communications device, execute the one or more of service parameters, settings or necessary components and provisioning the network infrastructure and the given identified mobile communications device to provide the service.

13. The service provider network infrastructure of claim 8, wherein the carrier, service provider and management authority comprise one or more entities, and the system is further enabled to: notify the management authority of the provisioning request; and await authorization of the provisioning request by the management authority.

14. The service provider network infrastructure of claim 13, wherein the system further comprises a billing system to reward one or more of the carrier, service provider or management authority.

15. A non-transitory data processor readable medium storing data processor code that when loaded into one or more components of a system adapts the system to provision a mobile communication device on a network, the data processor medium comprising:

code for identifying one or more devices on the network to which a notification of an offer of service should be sent, the identifying comprising:

providing search capabilities to access criteria and rules for selecting devices corresponding to a target audience for a service, and checking whether the devices are configured to support the service with its firmware and hardware capabilities;

code for pushing the notification of an offer of service to the identified devices over the network;

code for initiating, when the offer of service is accepted at a given identified device, a provisioning request from the device to one or more of a carrier, service provider or management authority; and code for provisioning the service from the service provider upon authorization of the provisioning request by the management authority.

16. The non-transitory data processor readable medium of claim 15, further comprising code for providing as a notification mechanism an indication or message to one or more of an e-mail module, a text messaging module, or a dedicated device service provisioning module for pushing the notification of an offer of service to the identified devices over the network.

17. The non-transitory data processor readable medium of claim 15, further comprising code for allowing a service provider to access criteria and rules for selecting the identified devices corresponding to a target audience for a service.

18. The non-transitory data processor readable medium of claim 15, further comprising code for displaying on the device the notification of an offer of service as one or more of a new message, a new icon, a visual indication on an existing icon, or an advertisement on a ribbon or task bar.

19. The non-transitory data processor readable medium of claim 15, further comprising: code for preparing one or more of service parameters, settings or necessary components for provisioning the offer of service; and code for executing, upon acceptance of the offer of service at the given identified device, the one or more of service parameters, settings or necessary components and provisioning the network infrastructure and the given identified device to provide the service.

20. The non-transitory data processor readable medium of claim 15, wherein the carrier, service provider and management authority comprise one or more entities, and the data processor readable medium further comprises: code for notifying the management authority of the provisioning request; and code for awaiting authorization of the provisioning request by the management authority.

* * * * *

UNITED STATES PATENT AND TRADEMARK OFFICE
CERTIFICATE OF CORRECTION

PATENT NO. : 8,457,603 B2  
APPLICATION NO. : 12/475278  
DATED : June 4, 2013  
INVENTOR(S) : Baraa El-Kadri et al.

Page 1 of 1

It is certified that error appears in the above-identified patent and that said Letters Patent is hereby corrected as shown below:

On the title page item (73), Assignee, delete "Research in Motion Limited, Waterloo, Ontario (CA)" and insert --Research In Motion Limited, Waterloo, Ontario (CA)--

Signed and Sealed this
Twentieth Day of August, 2013

Teresa Stanek Rea
*Acting Director of the United States Patent and Trademark Office*